United States Patent
Low et al.

(10) Patent No.: US 7,620,976 B2
(45) Date of Patent: Nov. 17, 2009

(54) PORTABLE AUTHENTICATION AND ACCESS CONTROL INVOLVING MULTIPLE IDENTITIES

(75) Inventors: Chee Meng Low, Singapore (SG); Peng Tsin Ong, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 796 days.

(21) Appl. No.: 11/256,847

(22) Filed: Oct. 21, 2005

(65) Prior Publication Data

US 2007/0050362 A1   Mar. 1, 2007

(30) Foreign Application Priority Data

Sep. 1, 2005   (WO) ............... PCT/SG2005/000299

(51) Int. Cl.
  *G06L 7/04*    (2006.01)
  *G06L 15/16*   (2006.01)
  *G06L 17/30*   (2006.01)
  *H04L 29/06*   (2006.01)

(52) U.S. Cl. ............................................. 726/4; 380/1
(58) Field of Classification Search ................ 726/4; 380/1
   See application file for complete search history.

(56) References Cited

U.S. PATENT DOCUMENTS

| 7,100,195 | B1 * | 8/2006 | Underwood ................... 726/2 |
| 2002/0010679 | A1 * | 1/2002 | Felsher ......................... 705/51 |
| 2002/0095572 | A1 | 7/2002 | Frank et al. | |
| 2002/0116630 | A1 | 8/2002 | Stehlin | |
| 2003/0182234 | A1 | 9/2003 | Degroot | |
| 2003/0200313 | A1 | 10/2003 | Peterka et al. | |
| 2004/0243835 | A1 | 12/2004 | Terzis et al. | |
| 2004/0250098 | A1 | 12/2004 | Licis | |
| 2005/0015674 | A1 | 1/2005 | Haugh | |
| 2005/0108536 | A1 | 5/2005 | Karimisetty et al. | |

FOREIGN PATENT DOCUMENTS

| EP | 0 465 871 A2 | 1/1992 |
| EP | 1 320 014 A2 | 6/2003 |
| WO | WO 00/56028 A1 | 3/2000 |
| WO | WO 02/057949 A1 | 7/2002 |
| WO | WO 03/015432 A1 | 2/2003 |
| WO | WO 03/019334 A2 | 3/2003 |
| WO | WO 03/040869 A2 | 5/2003 |

* cited by examiner

*Primary Examiner*—Kambiz Zand
*Assistant Examiner*—Stephen Sanders
(74) *Attorney, Agent, or Firm*—Francis Lammes; Stephen J. Walder, Jr.; Jeffrey S. LaBaw

(57) ABSTRACT

A mechanism is provided for protecting a plurality of electronic files. A portable access control lock is adapted for automatically maintaining an audit trail and allowing for configuring of access control rules for constraining user access based on a mandatory presence of specified users before granting access for each electronic file including any copies of the each electronic file of the plurality of electronic files. The constraining user access based on the mandatory presence of specified users comprises specifying persons P1 and P2 both of whose presence are required in order to update or view any of the each electronic file including the copies of the each electronic file. Persons P1 and P2 are prompted by a same access agent on a same access computer for authentication credentials to access the each electronic file and the each electronic file is accessed only when persons P1 and P2 are properly authenticated.

40 Claims, 5 Drawing Sheets

US 7,620,976 B2

PORTABLE AUTHENTICATION AND ACCESS CONTROL INVOLVING MULTIPLE IDENTITIES

CROSS-REFERENCE TO RELATED APPLICATIONS

Priority of International Patent Application No. PCT/SG2005/000299, filed on Sep. 1, 2005, is claimed under 35 U.S.C. §119.

TECHNICAL FIELD

The present invention is directed to system security, and more specifically to managing and tracking access to electronic files to ensure that only authorized persons can access the electronic files. The management and tracking of the electronic files includes allowing for implementation of complex access control rules and protecting against unauthorized copying and tampering.

BACKGROUND

Enterprises create and/or manage soft digital assets such as digital text documents, computer executable files, digital audio files, digital imagery files, digital video files, database files, email files, text files, and data files, for example. Such soft assets often include confidential and/or mission critical information. Examples of confidential and mission critical information include customer data such as bank statements, employee records, business projections, legal documents and company trade secrets. Such soft assets are also herein referred to as electronic files.

Frequently, soft assets need to be accessed by several employees in a company. The soft assets are usually deposited in some centrally shared repository or portal so that copies can be downloaded or uploaded. Such shared repositories and portals may implement simple access control procedures to control access to the soft assets. The simple access control rules are based on which employee is to be granted read/write privileges with respect to each electronic file. If authentication of the employees is required, simple authentication procedures based on simple IDs and passwords are implemented.

One problem is that, once a copy of an electronic file is downloaded from the shared repository, the company and the creator of the electronic file ceases to have control of any of the copies. The downloaded electronic document can be copied, edited and email-ed to unknown destinations and cannot be tracked.

Examples of shortcomings of access control include the inability to specify complex access control rules such as 1) only persons P1 and P2 can view (read) the electronic file, 2) persons P3 and P5 must both be present in order to view and/or update the electronic file, 3) person P1 can only view the electronic file but persons P2 and P3 can view and write to the electronic file, and 4) at least M number of users out of a group of N number of users must be present in order to update an electronic file.

In view of the foregoing, there is a need for a method and system for implementing complex access control rules and as well as auditing sensitive electronic files.

DETAILED DESCRIPTION

According to one aspect of certain embodiments, an electronic file is protected by associating a computer-implemented access control lock with the electronic file. The computer-implemented access control lock is adapted for allowing the author of the electronic file or other security personnel to specify complex access control rules for accessing the electronic file.

According to one aspect of certain embodiments, the complex access control rules include the constraining of user access based on the mandatory presence of specific users before access to the electronic file is granted.

According to another aspect of certain embodiments, the complex access control rules include constraining of user access based on authentication requirements, date range for access, time range for access, and computer ID or IP address of computers that are eligible to access the protected electronic file including copies of the protected electronic file.

According to another aspect, a reference copy of the computer-implemented access control lock for each protected electronic file is centrally managed at a managing server. Any updates of a given access control lock is synchronized to the reference copy of the access control lock at the server. The updated reference copy of the access control lock is then synchronized to all instances of the access control lock in the network.

Figure 1:
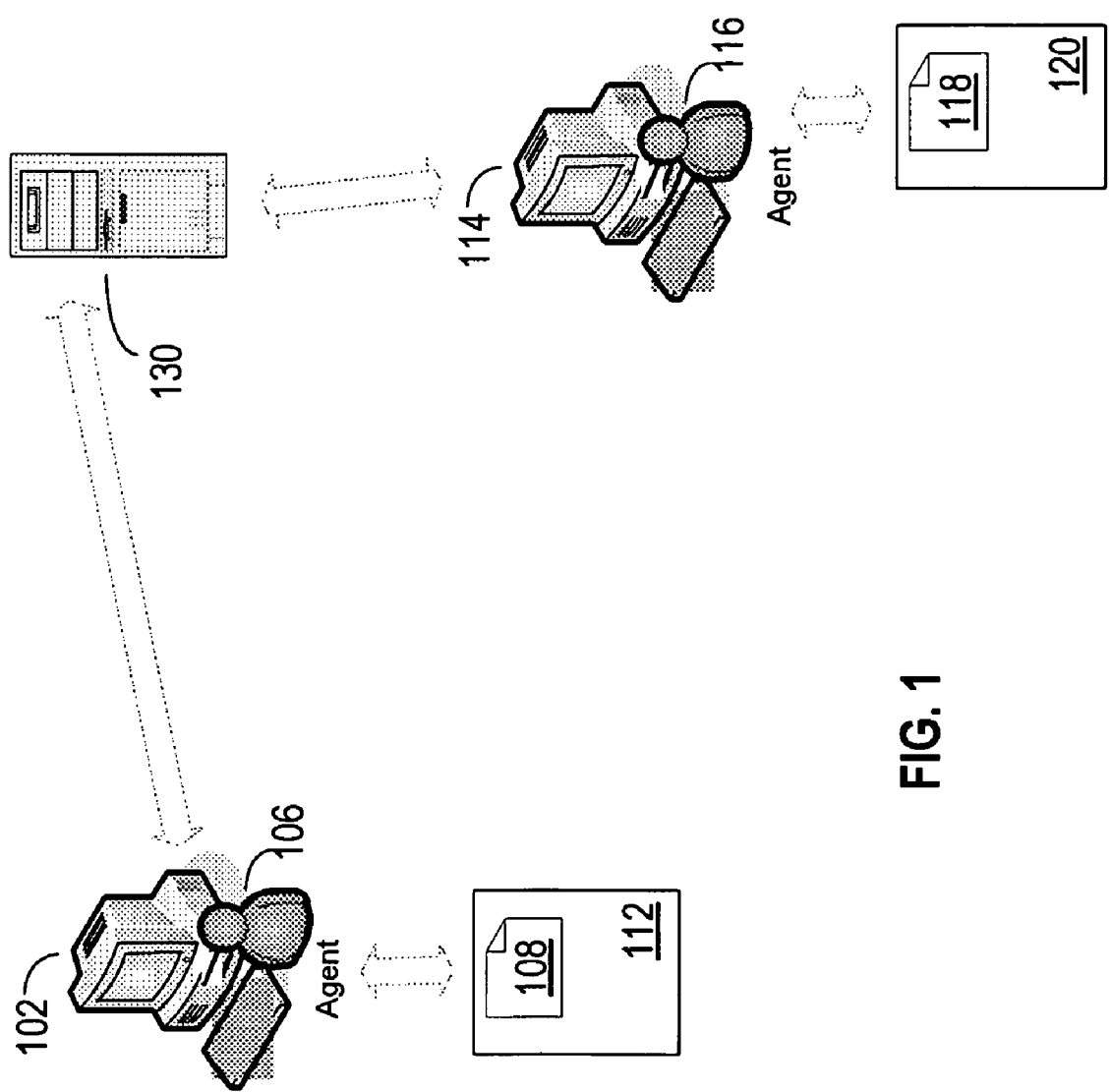
FIG. 1 is a high-level block diagram that illustrates some components used in a portable authentication and access control system for protecting electronic files, according to certain embodiments.

FIG. 1 is a high-level block diagram that illustrates some components used in a portable authentication and access control system for protecting electronic files, according to certain embodiments. FIG. 1 shows computers 102 and 114 used by corresponding users (not shown in FIG. 1) for creating and/or accessing electronic files. Each computer is associated with a corresponding access agent, such as agents 106 and 116. Computers 102 and 114 communicate with a central server 130 via access agents 106 and 116. Access agents are implemented either in software, hardware, firmware or some combination thereof, and may vary from implementation to implementation. The role of the access agent is described in greater detail herein with reference to FIG. 2, FIG. 4 and FIG. 5.

FIG. 1 also shows electronic files 108 and 118. Each electronic file is protected by being wrapped or encapsulated by a corresponding logical access control lock, such as access control locks 112 and 120. The architecture of the access control lock is described in greater detail herein with reference to FIG. 3. Even though FIG. 1 shows only one server and two user computers, the embodiments are not limited to one server and two user computers.

Some non-limiting examples of electronic files include files containing encryption keys, authentication credential wallets, computer executable files, digital audio files, digital imagery files, digital video files, database files, email files, and text files.

Figure 2:
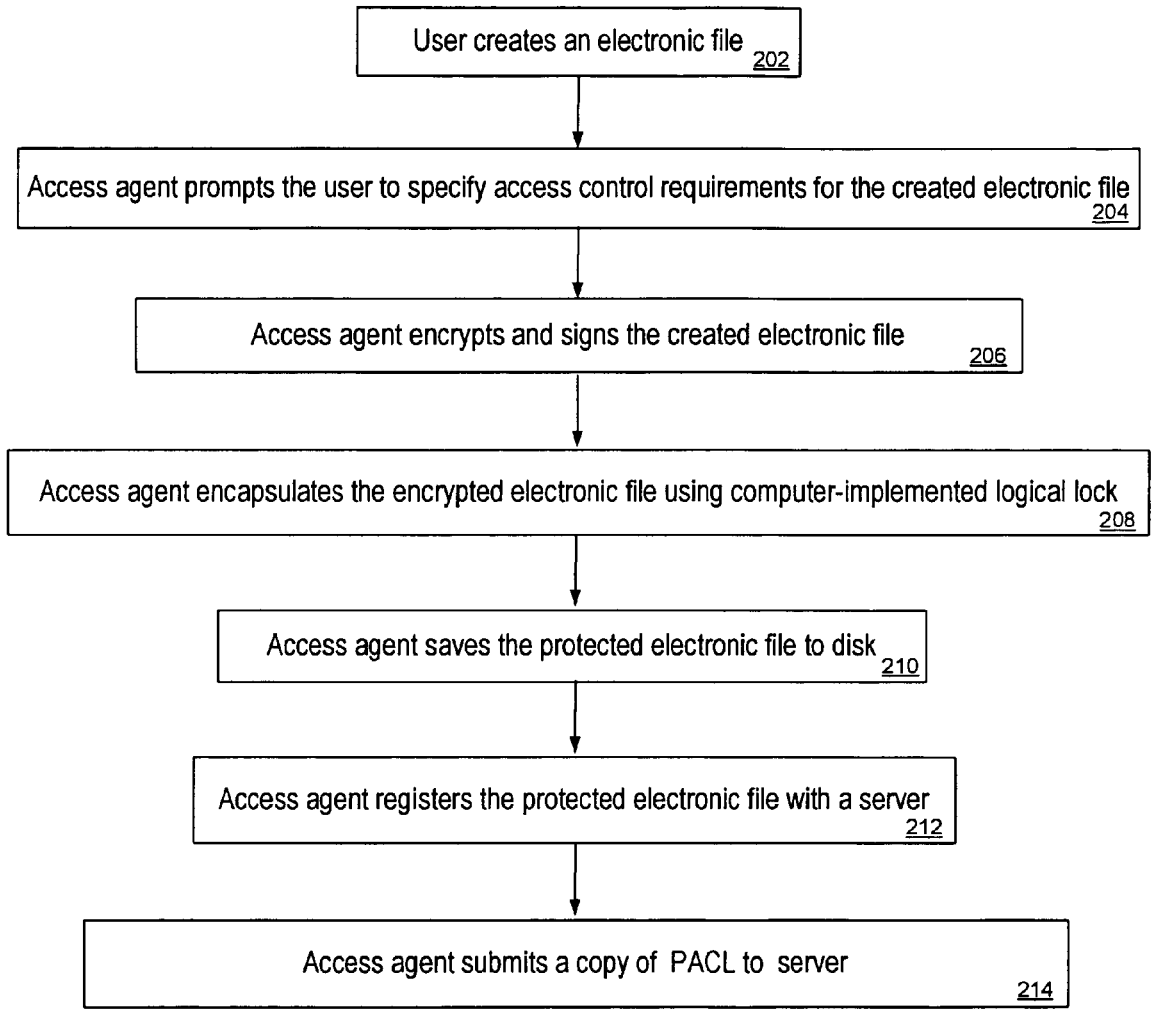
FIG. 2 is a flowchart that illustrates some high-level procedures for protecting electronic files, according to certain embodiments.

FIG. 2 is a flowchart that illustrates some high-level procedures for protecting electronic files, according to certain embodiments. At block 202 of FIG. 2, a user creates an electronic file using a computer. At block 204, an electronic access agent, associated with the user and running on the user's computer, prompts the user to specify complex access control requirements for the created electronic file. For example, the user can craft access control requirements that specify which users or combination of users have read-only access, and those who have read-and-write access.

The user can also specify types of authentication that are required. Authentication can be a one-factor type of authentication or a two-factor type of authentication. A two-factor authentication combines a password with an authentication token. Such a two-factor authentication leverages what the user possesses (the authentication token) and what the user knows (the password). The user can specify a date range and/or time of day that the electronic file can be accessed. In addition, the user can specify the IP addresses of computers that are eligible to access the created electronic file.

At block 206, the access agent encrypts and signs the created electronic file. As a non-limiting example, the access agent can encrypt the electronic file using randomly-generated encryption keys. At block 208, the access agent encapsulates the encrypted electronic file using a computer-implemented logical lock. Such a lock is herein also referred to as a portable access control lock (PACL). The portable access control lock can be implemented in hardware, firmware, software or some combination thereof, and thus can vary from implementation to implementation. The PACL is described in greater detail herein with reference to FIG. 3.

At block 210, after the electronic file is encapsulated with the PACL, the access agent saves the protected electronic file to disk. At block 212, the access agent registers the protected electronic file with a server. As part of the registration, the protected electronic file is given a unique ID or URI. In addition, at block 214, the access agent submits the PACL associated with the protected electronic file that is being registered to the server for purposes of creating an audit trail, among other functions. The PACL that is submitted to the server is also herein referred to as the reference PACL. The reference PACL is stored at the central server and is used to track all accesses of any copy of the electronic file. The access control rules in the reference PACL can be updated by any person that is authorized to make changes to the access control rules. The updated reference PACL applies to all copies of the electronic file. According to certain embodiments, users may be divided into user-groups. The members in each user-group share a group key-pair. Thus, if a new user is added to the group, the new user automatically has use of the group key-pair and can unlock a protected document using the group key-pair.

The user that created the protected electronic file can choose to deposit the protected electronic file in a shared electronic repository that can be accessed by other users in the network. The user may also choose to distribute copies of the protected electronic file by email to various users.

Figure 3:
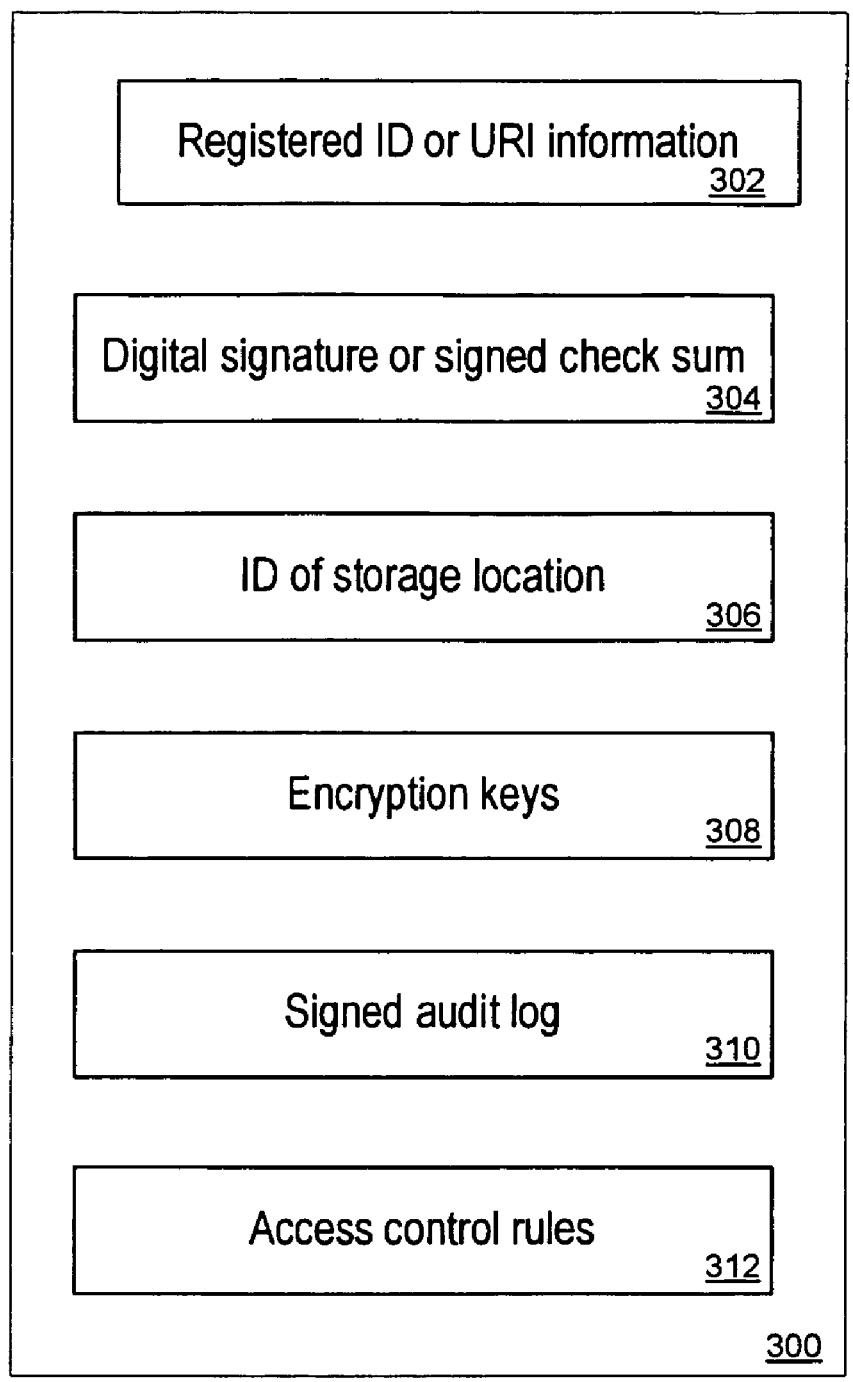
FIG. 3 is a high-level block diagram that illustrates a logical architecture of a portable access control lock, according to certain embodiments.

FIG. 3 is a high-level block diagram that illustrates a logical architecture of a portable access control lock, according to certain embodiments. FIG. 3 shows a portable access lock 300 that includes the following optional information: a registered ID or URI information 302 of the corresponding protected electronic file, a digital signature or signed check sum 304, a designated storage location 306 for the protected electronic file, encryption keys 308 for decrypting the protected electronic file, a signed audit log 310 for tracking all reads and writes of the protected electronic file including copies of the protected electronic file, and a set of access control rules 312 that specify access restrictions based on the identity of users or combination of users, authentication requirements, date range for access, time range for access, and computer ID or IP address of computers that are eligible to access the protected electronic file including copies of the protected electronic file.

Non-limiting examples of access control rules that can be implemented by the PACL include: 1) only users P1 and P2 can view the electronic document, 2) users P2 and P3 must both be present in order to view and/or update the electronic file, 3) user P1 has "read-write" privileges while user P2 only has "read-only" privileges with respect to the electronic file, 4) at least M number of users out of a group of N number of users must be present in order to update an electronic file, 5) user-access can be based on a date range, time of day, or location where the electronic file can be accessed, 6) a distributed escrow capability by which a user's employer can access the user's electronic files, 7) an audit trail identifying the users who have read and/or modified the electronic file, and 8) use of physical authentication such as the use of smart-cards, authentication tokens, one-time passwords (OTP) devices, and proximity cards. In a distributed escrow, individual managers serve as escrow authorities for their respective staff. In a distributed escrow situation, an employee's electronic files can be protected by a joint lock that requires both the employee's manager and at least one other manager to unlock the employee's electronic files, according to certain embodiments.

According to certain embodiments, only the author of the protected electronic file has the authority to modify the rules in the corresponding PACL of the protected electronic file. According to certain other embodiments, the access agent may allow additional users or combination of users to have management rights to the PACL in accordance to the author's instructions or the organization's security policies. Thus, users that have management rights can modify the rules of a given PACL via the user's access agent. A modified PACL is synchronized to the appropriate managing server when the access agent has online access to the managing server. If the access agent is offline, then the updated PACL is queued for later submission to the managing server.

Further, after the updated PACL corresponding to a given protected electronic file is synchronized to the managing server, the updated PACL is then synchronized to all the saved instances of the PACL in the network. For example, assume that user P2 updates the PACL corresponding to a copy of a protected electronic file. Further, assume that user P3 also has copy of the same protected electronic file. Once user P2's updated PACL is synchronized to the managing server, the access agent of user P3 downloads the latest PACL either pro-actively or when the electronic file is next accessed by P3.

According to certain embodiments, the PACL corresponding to a given protected electronic file can be managed directly from the managing server. For example, assume that user P5's employment has been terminated. P5's employer can remove P5's access privileges from the PACLs of all relevant protected electronic files that are registered with the managing server. The updated PACLs are then synchronized to corresponding instances in the network.

Figure 4:
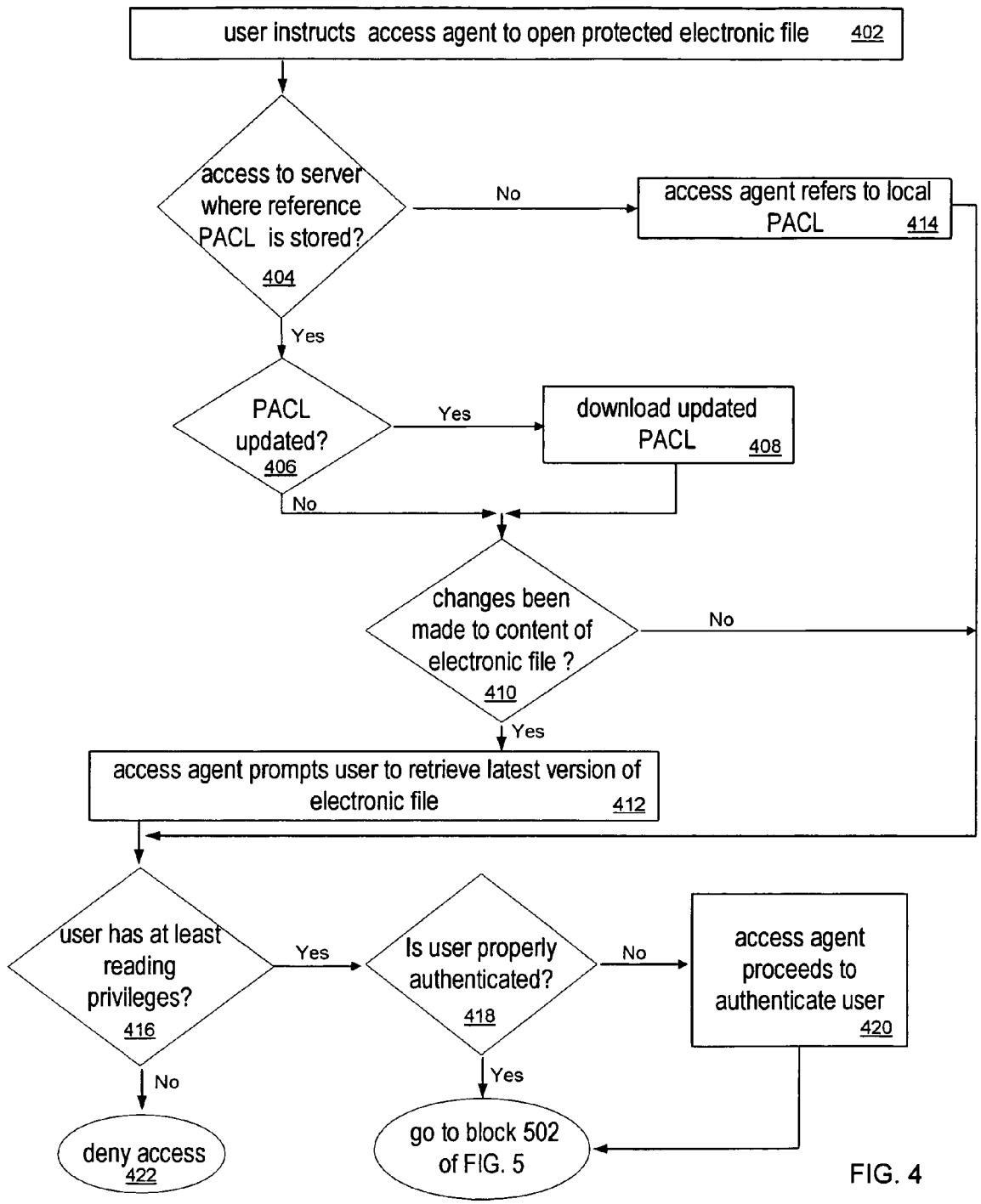
FIG. 4 is a flowchart that illustrates some of the functions performed by an access agent when a user attempts to access a protected electronic file, according to certain embodiments.

FIG. 4 is a flowchart that illustrates some of the functions performed by an access agent when a user attempts to open a protected electronic file, according to certain embodiments. For purposes of explanation, assume that a user P2 has a copy of a protected electronic file. P2 may have obtained the protected electronic file by email or by previously downloading a copy from the server or that a copy was previously saved on disk.

At block 402, user P2 instructs the access agent on the user's local computer to open the protected electronic file. At block 404, the access agent determines whether there is communication access to some central server where the reference PACL corresponding to the protected electronic file is stored. If it is determined that there is communication access to the server where the reference PACL corresponding to the protected electronic file is stored, then at block 406, the access agent determines if the local PACL encapsulating the electronic file is the same as the reference PACL.

If it is determined that the reference PACL includes updated information, then at block 408, the access agent downloads the reference PACL to the user's local computer to update the local PACL. Further, at block 410, the access agent determines if changes have been made to the content of the electronic file by checking the audit log in the updated PACL. If it is determined that changes have been made to the content of the electronic file, then at block 412 the access agent prompts the user to retrieve the latest version of the electronic file. As a non-limiting example, the user P2 can refer to the audit log in order to retrieve the latest version of the electronic file from a designated location or from the user who last updated the electronic file.

If it is determined at block 404 that there is no communication access to the server where the reference PACL corresponding to the protected electronic file is stored, then at block 414, the access agent refers to the local PACL that is encapsulating the local copy of the electronic file.

By referring to the updated PACL, or local PACL, it is determined that user P2 has at least reading privileges with respect to the electronic file at block 416. If the user does not have at least reading privileges, then access is denied at block 422. If the user has at least reading privileges, then at block 418, the access agent verifies that user P2 is properly authenticated. If user P2 is not properly authenticated, then at block 420, the access agent proceeds to authenticate user P2. Some non-limiting examples of authentication requirements as specified by the PACL are as follows. P2 is to be authenticated using a two-factor authentication procedure. For example, P2 must produce his smartcard and PIN. In another example, the PACL may require that both users P2 and P3 be present before the electronic file can be opened. In such a case, the access agent will prompt both P2 and P3 for authentication credentials. Once a user is properly authenticated, the role of the access agent is further described herein with reference to FIG. 5

Figure 5:
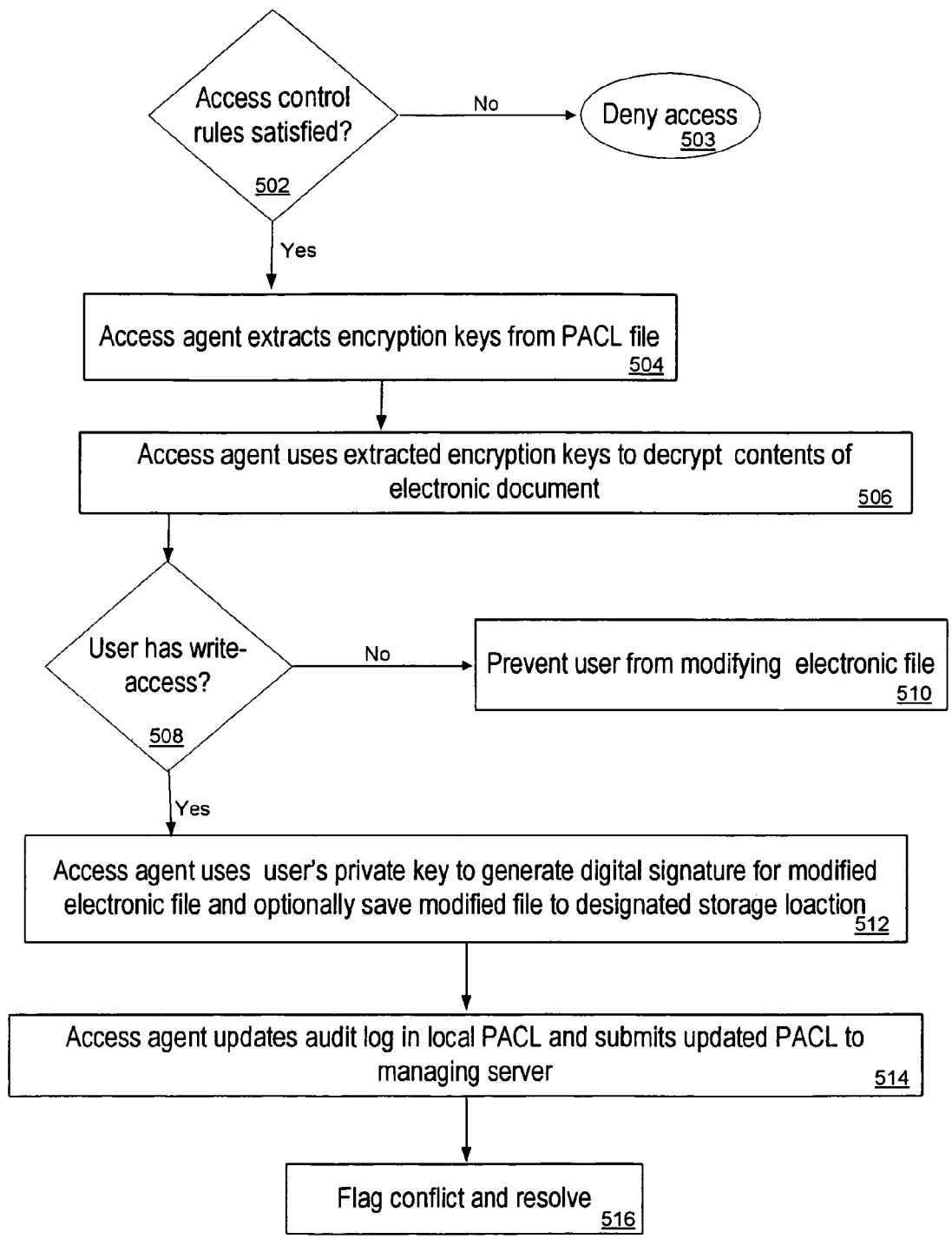
FIG. 5 is flowchart that illustrates some of the functions performed by the access agent after a user is authenticated, according to certain embodiments.

FIG. 5 is flowchart that illustrates some of the functions performed by the access agent after a user is authenticated, according to certain embodiments. For purposes of explanation, assume that a user P2 has a copy of a protected electronic file that P2 wishes to open. Further assume that user P2 has been fully authenticated by the access agent in accordance with the access control rules in the corresponding PACL.

At block 502, once user P2 has been fully authenticated, the access agent may perform additional checks in accordance to the access control rules in the PACL. Access to the electronic file may be conditioned upon a date range, time of day and location of access. For example, the PACL may specify that access to the electronic file is only allowed between 9:00 a.m. and 5:00 p.m. on any day between Aug. 8, 2005 and Sep. 8, 2005, and only from a computer within the corporate LAN. In such a case, the access agent consults the user's computer's operating system (OS) clock and network settings to determine if the PACL access control requirements are satisfied. To prevent tampering of the OS clock and network settings, the access agent may employ a number of defensive tactics. For example, the access agent can periodically synchronize the user's computer OS clock with that of the managing server. In the case where the access agent is offline, then the access agent can monitor for any user attempt to modify the OS clock/network settings or any user attempt to kill the agent process. If user tampering is detected or suspected, the access agent can block the user's access to the protected electronic document until the access agent can regain online contact with the managing server. If the access control rules are not satisfied, then at block 503, access is denied.

At block 504, after determining that the access rules in the PACL are satisfied, the access agent extracts from the PACL the file encryption keys needed to decrypt the electronic document. As a non-limiting example, assume that the encryption keys needed to decrypt the electronic document are cryptographically protected by a public-private key-pair. Thus, the access agent uses P2's private key in order to extract the encryption keys needed to decrypt the electronic document that P2 wishes to open.

At block 506, the access agent uses the extracted encryption keys to decrypt the contents of the electronic document that P2 wishes to open. At block 508, if user P2 wishes to modify the electronic file, the access agent determines if user P2 has write-access.

If it is determined that user P2 has no write-access, then at block 510, the access agent prevents user P2 from modifying the electronic file by not allowing P2 to save the modifications. If it is determined that user P2 does have write-access, then at block 512, the access agent uses the user P2's private key to generate a digital signature for the modified electronic file. At block 514, the access agent updates the audit log in the local PACL and submits the updated PACL to the managing server, if the access agent has online access to such a managing server. Optionally, the access agent can save the modified electronic file to a designated storage location. If the access agent is offline at the time the PACL is updated, then the updated PACL is queued for later submission to the managing server when the access agent next goes online. According to certain embodiments, each new entry in the audit log is signed with the user's private key.

At block 516, if at the time the updated PACL is submitted to the managing server on behalf of user P2 collides with an updated PACL submission on behalf another user, say user P5, then the managing server will flag the conflict and resolve the conflict based on pre-determined resolution rules and/or notify users P2 and P5 of the conflict. Users P2 and P5 may optionally resolve the conflict manually.

According to certain embodiments, the access control rules in a PACL for documents that are classified as highly sensitive can include the rule that before a user can read or write such highly sensitive documents, the agent is required to have online access to the managing server in order to keep up-to-date audit logs on the managing server for such documents.

In the foregoing specification, embodiments of the invention have been described with reference to numerous specific details that may vary from implementation to implementation. It will be evident that various modifications and changes may be made thereto without departing from the broader spirit and scope of the invention. The specification and drawings are, accordingly, to be regarded in an illustrative rather than a restrictive sense.

We claim:

1. A computer-implemented method for protecting a plurality of electronic files, the computer-implemented method comprising using a portable access control lock that is adapted for automatically maintaining an audit trail and allowing for configuring of access control rules for constraining user access based on a mandatory presence of specified users before granting access for each electronic file including any copies of said each electronic file of said plurality of electronic files, wherein said constraining user access based on said mandatory presence of specified users further comprises specifying persons P1 and P2 both of whose presence are required in order to update or view any of said each electronic file including said copies of said each electronic file, wherein P1 and P2 are from a set of authorized users associated with said each electronic file, wherein persons P1 and P2 are prompted by a same access agent on a same access computer for authentication credentials to access said each electronic file, and wherein said each electronic file is accessed only when persons P1 and P2 are properly authenticated.

2. The computer-implemented method of claim 1, wherein said access agent aids in enforcing said access control rules and authenticates users who wish to access any of said plurality of electronic files.

3. The computer-implemented method of claim 1, further comprising using said portable access control lock for implementing a distributed escrow capability for said each electronic file of said plurality of electronic files, wherein said distributed escrow capability grants reading and writing privileges associated with said each electronic file by allowing said each electronic file to be unlocked only if the author's manager and one other manager is present.

4. The computer-implemented method of claim 1, further comprising using said portable access control lock for allowing for constraining of access based on a date range for access for any of said each electronic file including said copies of said each electronic file.

5. The computer-implemented method of claim 1, further comprising using said portable access control lock for allowing for constraining of access based on time of day for access for any of said each electronic file including said copies of said each electronic file.

6. The computer-implemented method of claim 1, further comprising using said portable access control lock for allowing for constraining of access based on an identity of said accessing computer for any of said each electronic file including said copies of said each electronic file.

7. The computer-implemented method of claim 1, wherein said constraining user access based on said mandatory presence of specified users further comprises at least M number persons from among a group of N pre-selected authorized persons required to be present in order to update or view said each electronic file including said copies of said each electronic file, wherein M and N are positive integers and M is less than N.

8. The computer-implemented method of claim 1, further comprising specifying one or more persons who are allowed only reading privileges for any of said each electronic file including said copies of said each electronic file.

9. The computer-implemented method of claim 1, further comprising specifying one or more persons who are allowed both reading and writing privileges for any of said each electronic file including said copies of said each electronic file.

10. The computer-implemented method of claim 1, further comprising synchronizing any modifications to said portable access control lock to all instances of said portable control lock including instances corresponding to said copies of said each electronic file.

11. The computer-implemented method of claim 1, wherein said automatically maintaining said audit trail includes registering said each electronic file with a central server and submitting said portable access control lock corresponding to said each electronic file when said each electronic file is first created.

12. The computer-implemented method of claim 1, further comprising using said portable access control lock for specifying a type of user authentication required for accessing said each electronic file including said copies of said each electronic file.

13. The computer-implemented method of claim 12, wherein said type of user authentication includes any type of user authentication of a set of user authentication comprising: a strong user password, a smart card, biometric data, and an RFID token.

14. The computer-implemented method of claim 1, further comprising creating and binding one or more public-private key-pairs to each user associated with said plurality of electronic files.

15. A file protection system for protecting a plurality of electronic files, said file protection system comprising a portable access control lock corresponding to each protected electronic file of said plurality of electronic files, and an access agent associated with said portable access control lock, wherein said portable access control lock is adapted for automatically maintaining an audit trail and allowing for configuring of access control rules for constraining user access based on a mandatory presence of specified users before granting access for each protected electronic file, wherein said constraining user access based on said mandatory presence of specified users further comprises specifying persons P1 and P2 both of whose presence are required in order to update or view any of said each electronic file including said copies of said each electronic file, wherein P1 and P2 are from a set of authorized users associated with said each electronic file, wherein persons P1 and P2 are prompted by a same access agent on a same access computer for authentication credentials to access said each electronic file, and wherein said each electronic file is accessed only when persons P1 and P2 are properly authenticated.

16. The file protection system of claim 15, wherein said portable access control lock includes a set of access control rules corresponding to said each protected electronic file.

17. The file protection system of claim 15, wherein said portable access control lock includes a server-registered ID or URI associated with said each protected electronic file.

18. The file protection system of claim 15, wherein said portable access control lock includes a digital signature for document contents of said each protected electronic file.

19. The file protection system of claim 15, wherein said portable access control lock includes a designation as to a storage location of said each protected electronic file.

20. The file protection system of claim 15, wherein said portable access control lock includes document encryption keys corresponding to said each protected electronic file, wherein said document encryption keys are for decrypting corresponding said each electronic file.

21. The file protection system of claim 20, wherein said document encryption keys are protected using one or more key-pairs of public-private key encryption.

22. The file protection system of claim 15, wherein said portable access control lock includes a signed audit log of reads and writes associated with said each protected electronic file.

23. The file protection system of claim 15, further includes a server for centrally managing said portable access control lock corresponding to said each protected electronic file.

24. A computer-implemented method for protecting a plurality of electronic files, the computer-implemented method comprising:

using an access agent to aid an author-user in configuring access control rules for an electronic file created by said author-user;

wrapping a corresponding logical computer-implemented lock around said electronic file to form a protected electronic file, wherein said corresponding logical computer-implemented lock includes allowing for configuring of access control rules for constraining user access based on a mandatory presence of specified users before granting access to said protected electronic file, wherein said constraining user access based on said mandatory presence of specified users further comprises specifying persons P1 and P2 both of whose presence are required in order to update or view any of said each electronic file including said copies of said each electronic file, wherein P1 and P2 are from a set of authorized users associated with said each electronic file, wherein persons P1 and P2 are prompted by said access agent on a same access computer for authentication credentials to access said each electronic file, and wherein said protected electronic file is accessed only when persons P1 and P2 are properly authenticated;

registering said protected electronic file at a central server; and submitting said corresponding logical computer-implemented lock to said central server for auditing said protected electronic file.

25. The computer-implemented method of claim 24, further comprising determining if said corresponding logical computer-implemented lock stored on said central server has been updated when a copy of said protected electronic file is subsequently accessed by a user.

26. The computer-implemented method of claim 25, further comprising downloading, from said central server, an updated copy of said corresponding logical computer-implemented lock stored on said central server if said corresponding logical computer-implemented lock stored on said central server has been updated.

27. The computer-implemented method of claim 24, further comprising determining if said protected electronic file stored on said central server has been updated when a copy of said protected electronic file is subsequently accessed by a user.

28. The computer-implemented method of claim 27, further comprising prompting said user to retrieve an updated copy of said protected electronic file if it is determined that said protected electronic file stored on said central server has been updated.

29. The computer-implemented method of claim 24, further comprising encrypting said protected electronic file using document encryption keys.

30. The computer-implemented method of claim 29, further comprising encrypting said document encryption keys using a public-private key-pair.

31. The computer-implemented method of claim 24, further comprising using said corresponding logical computer-implemented lock for implementing a distributed escrow capability for said protected electronic file, wherein said distributed escrow capability automatically grants reading and writing privileges to a manager of said author-user.

32. The computer-implemented method of claim 24, further comprising using said corresponding logical computer-implemented lock for allowing for constraining of access based on a date range for access of said protected electronic file, including any copies of said protected electronic file.

33. The computer-implemented method of claim 24, further comprising using said corresponding logical computer-implemented lock for allowing for constraining of access based on time of day for access of said protected electronic file, including any copies of said protected electronic file.

34. The computer-implemented method of claim 24, further comprising using said corresponding logical computer-implemented lock for allowing for constraining of access based on an identity of an accessing computer for access of said protected electronic file, including any copies of said protected electronic file.

35. The computer-implemented method of claim 24, wherein said constraining user access based on said mandatory presence of specified users further comprises at least M number persons from among a group of N pre-selected authorized persons required to be present in order to update or view said protected electronic file, including any copies of said protected electronic file, wherein M and N are positive integers and M is less than N.

36. A computer-implemented portable access control lock for protecting an electronic file, the computer-implemented portable access control lock comprising:

a registered ID information of said electronic file;

encryption keys; and a set of access control rules, wherein said access control rules is configurable for constraining user access based on a mandatory presence of specified users before granting access to said protected electronic file, wherein said constraining user access based on said mandatory presence of specified users further comprises specifying persons P1 and P2 both of whose presence are required in order to update or view any of said each electronic file including said copies of said each electronic file, wherein P1 and P2 are from a set of authorized users associated with said each electronic file, wherein persons P1 and P2 are prompted by a same access agent on a same access computer for authentication credentials to access said each electronic file, and wherein said each electronic file is accessed only when persons P1 and P2 are properly authenticated.

37. The method of claim 1, further comprising using said access agent to periodically synchronize an operating system clock of said access computer with a remote operating system clock of a central server computer.

38. The method of claim 1, further comprising using said access agent to monitor for any attempts by a user to modify an operating system clock or computer network settings of said access computer, wherein said access agent blocks said users access upon detection of said any attempts.

39. The method of claim 1, further comprising granting reading and writing privileges for said each electronic file that is classified as sensitive only when said access agent, that controls said sensitive electronic file, is logged onto a central server that is maintaining said audit trail.

40. The method of claim 1, wherein said portable access control lock is protected by a group-based public-private key-pair shared by a pre-determined group of users.

* * * * *